United States Patent
Suzuki (10) Patent No.: US 8,860,795 B2
(45) Date of Patent: Oct. 14, 2014

(54) MASQUERADING DETECTION SYSTEM, MASQUERADING DETECTION METHOD, AND COMPUTER-READABLE STORAGE MEDIUM

(75) Inventor: Tetsuaki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 13/126,339

(22) PCT Filed: Oct. 28, 2009

(86) PCT No.: PCT/JP2009/005709
§ 371 (c)(1),
(2), (4) Date: Jul. 7, 2011

(87) PCT Pub. No.: WO2010/050206
PCT Pub. Date: May 6, 2010

(65) Prior Publication Data
US 2011/0254942 A1 Oct. 20, 2011

(30) Foreign Application Priority Data

Oct. 28, 2008 (JP) ................ 2008-277212

(51) Int. Cl.
*H04N 11/02* (2006.01)
*G06K 9/00* (2006.01)
*G06T 3/00* (2006.01)
*G06T 11/00* (2006.01)
*A63F 13/98* (2014.01)
*A63K 1/00* (2006.01)

(52) U.S. Cl.
CPC .......... *G06K 9/00899* (2013.01); *G06T 3/0031* (2013.01); *G06T 11/008* (2013.01); *A63F 13/02* (2013.01); *A63K 1/00* (2013.01); *G06K 9/00221* (2013.01)
USPC ............... 348/77; 382/154; 382/293; 463/36; 472/85; 600/427; 700/191

(58) Field of Classification Search
CPC ....................................... H04N 7/18
USPC ........................................................... 348/77
See application file for complete search history.

(56) References Cited

U.S. PATENT DOCUMENTS 7,218,760 B2 * 5/2007 Gu et al. ................ 382/118
7,532,750 B2 * 5/2009 Sasaki et al. ................. 382/154

(Continued)

FOREIGN PATENT DOCUMENTS

CN 101043336 9/2007
JP 2003-178306 6/2003

(Continued)

OTHER PUBLICATIONS

International Search report, PCT/JP2009/005709, Dec. 8, 2009.

(Continued)

*Primary Examiner* — William C Vaughn, Jr.
*Assistant Examiner* — Luis M Perez
(74) *Attorney, Agent, or Firm* — Young & Thompson (57) ABSTRACT

A masquerading detection system includes: an imaging unit (2) that obtains a first image by imaging an inspection object (12) from a first angle, and a second image by imaging the inspection object from a second angle which is different from the first angle; a unit (101) that detects first feature points from the first image, obtains first feature point coordinates of the detected feature points, detects second feature points from the second image, and obtains second feature point coordinates of the detected feature points; a unit (104) that obtains transformed coordinates by performing a plane projective transformation for the second feature point coordinates from the second image to the first image; and a unit (105) that determines that masquerading has been attempted when the difference between the transformed coordinates and the corresponding first feature point coordinates is equal to or smaller than a predetermined value.

16 Claims, 5 Drawing Sheets

(56) References Cited

U.S. PATENT DOCUMENTS

| | | | | |
|---|---|---|---|---|
| 7,613,501 B2* | 11/2009 | Scherch | ............ | 600/427 |
| 7,798,904 B2* | 9/2010 | Hamano et al. | ............ | 463/36 |
| 7,876,931 B2* | 1/2011 | Geng | ............ | 382/118 |
| 7,941,240 B2* | 5/2011 | Katoh et al. | ............ | 700/191 |
| 8,112,173 B2* | 2/2012 | Katoh et al. | ............ | 700/191 |
| 8,363,981 B2* | 1/2013 | Tonomura | ............ | 382/293 |
| 8,401,253 B2* | 3/2013 | Yamada et al. | ............ | 382/118 |
| 2004/0136574 A1 | 7/2004 | Kozakaya et al. | | |
| 2007/0288748 A1 | 12/2007 | Kakiuchi et al. | | |
| 2008/0137919 A1 | 6/2008 | Kozakaya et al. | | |

FOREIGN PATENT DOCUMENTS

| | | |
|---|---|---|
| JP | 2004-192378 | 7/2004 |
| JP | 2004-362079 | 12/2004 |
| JP | 2006-338092 | 12/2006 |
| JP | 2007-304801 | 11/2007 |
| JP | 2008-54754 | 3/2008 |

OTHER PUBLICATIONS

Kanazawa and Kanatani, "Detection of Feature Points for Computer Vision", The Journal of the Institute of Electronics, Information and Communication Engineers, vol. 87, No. 12, 2004.

T.K. Leung, M. C. Burl, and P. Perona, "Finding Faces in Cluttered Scenes using Random Labeled Graph Matching", Fifth International Conference on Computer Vision pp. 637-644, 1995.

R. Sukthankar, R.G. Stockton, M.D. Mullin, "Smarter presentations: Exploiting Homography in Camera-Projector Systems", Proceedings of International Conference on Computer Vision, vol. 1, pp. 247-253, Jul. 2001.

First Office Action issued Jan. 17, 2013 by the State Intellectual Property Office of People's Republic of China in corresponding Chinese Patent Application No. 200980142953.9, 3 pages.

* cited by examiner

FIG. 5

MASQUERADING DETECTION SYSTEM, MASQUERADING DETECTION METHOD, AND COMPUTER-READABLE STORAGE MEDIUM

TECHNICAL FIELD

The present invention relates to a masquerading detection system, a masquerading detection method, and a masquerading detection program that can recognize a person with the use of a photograph of a registered person or a face image displayed on a monitor, particularly when performing person recognition.

BACKGROUND ART

A masquerading detection system is a system that performs person recognition using a photograph of a registered person or a face image displayed on a monitor, when the authentication is based on a face and a head, for example. Such a masquerading detection system and a masquerading detection method are disclosed in Patent Document 1, for example. Paragraph [0015] of the document discloses that the lighting environment is changed by using an illuminating lamp, and masquerading can be eliminated based on the degree of similarity between face images obtained in different lighting environments. Paragraph [0061] of the document discloses various images of a face taken from various directions are obtained in advance, and the face images taken from certain directions are registered as an "authentication dictionary".

Paragraphs [0015] through [0021] of Patent Document 2 disclose that three-dimensional information about a user is generated with the use of user images and respective image obtaining angles, and is compared with the three-dimensional shape of the face of the person that is stored beforehand. In this manner, masquerading using a photograph is eliminated. It should be noted that Patent Document 3, Non-Patent Document 1, Non-Patent Document 2, and Non-Patent Document 3 will be described later.

RELATED ART DOCUMENTS

Patent Documents

Patent Document 1: Japanese Laid-Open Patent Publication No. 2003-178306
Patent Document 2: Japanese Laid-Open Patent Publication No. 2004-362079
Patent Document 3: Japanese Laid-Open Patent Publication No. 2006-338092

Non-Patent Documents

Non-Patent Document 1: Kanazawa and Kanatani, "Detection of Feature Points for Computer Vision", The Journal of the Institute of Electronics, Information and Communication Engineers, Vol. 87, No. 12, 2004
Non-Patent Document 2: T. K. Leung, M. C. Burl, and P. Perona, "Finding Faces in Cluttered Scenes using Random Labeled Graph Matching", Fifth International Conference on Computer Vision pp. 637-644, 1995
Non-Patent Document 3: R. Sukthankar, R. G. Stockton, M. D. Mullin, "Smarter presentations: Exploiting Homography in Camera-Projector Systems", Proceedings of International Conference on Computer Vision, Vol. 1, pp. 247-253, July 2001

DISCLOSURE OF THE INVENTION

However, the related arts disclosed in the above documents have room for improvement in the following aspects.

First, to detect masquerading, it is necessary to prepare an additional device other than the imaging device to be used for authentication. For example, a controllable external lighting is required for creating various lighting environments, and a dedicated distance detection device is required for measuring distance. Further, a complicated processing apparatus is required for obtaining three-dimensional information about a person.

Secondly, there is a high probability that masquerading using a photograph is inadvertently accepted due to a change in the lightning environment at the time of authentication. For example, by a technique utilizing a main component analysis, masquerading is detected based on a variation of luminance of an object. However, as the lighting environment is remarkably changed during authentication, the variation of the luminance of the object is made larger. As a result, the probability of inadvertently accepting a photograph as an actual object becomes higher.

The present invention has been made in view of the above circumstances, and an object thereof is to provide a masquerading detection system, a masquerading detection method, and a masquerading detection program that can accurately detect masquerading based on obtained images, without any additional devices other than an imaging device. Another object of the present invention is to provide a masquerading determining system that is resistant to changes of lighting environments.

According to the present invention, there is provided a masquerading detection system including: an imaging unit that obtains a first image by imaging an inspection object from a first angle, and a second image by imaging the inspection object from a second angle which is different from the first angle; a calculating unit that detects first feature points from the first image, obtains first feature point coordinates representing the positions of the detected feature points, detects second feature points from the second image, and obtains second feature point coordinates representing the positions of the detected feature points; a feature point associating unit that associates the first feature points with the second feature points; a feature transforming unit that obtains transformed coordinates by performing a plane projective transformation for the second feature point coordinates from the second image to the first image; and a similarity determining unit that determines that masquerading has been attempted when the difference between the transformed coordinates and the corresponding first feature point coordinates is equal to or smaller than a predetermined value.

According to the present invention, there is provided a masquerading detection method including: the step of obtaining a first image by imaging an inspection object from a first angle; the step of calculating first feature point coordinates from the first image; the step of obtaining a second image by imaging the inspection object from a second angle; the step of calculating second feature point coordinates from the second image; the feature point associating step of associating the first feature point coordinates with the second feature point coordinates; the feature transforming step of obtaining transformed coordinates by performing a plane projective transformation for the second feature point coordinates from the second image to the first image; and the similarity determining step of determining that masquerading has been attempted when the difference between the transformed coordinates and the corresponding first feature point coordinates is equal to or smaller than a predetermined value.

According to the present invention, there is provided a masquerading detection program for causing a computer to perform: a feature point coordinate calculating process to obtain first feature point coordinates representing the positions of first feature points from a first image of an inspection object, the first image being obtained from a first angle, and obtain second feature point coordinates representing the positions of second feature points from a second image of the inspection object, the second image being obtained from a second angle different from the first angle; a feature point associating process to associate the first feature points with the second feature points; a feature transforming process to obtain transformed coordinates by performing a plane projective transformation for second coordinates of the second feature points from the second image to the first image, the second feature points being associated using the first feature points and the second feature points; and a similarity determining process to determine that masquerading has been attempted when a difference between the transformed coordinates and first coordinates of the first feature points is equal to or smaller than a predetermined value.

Employing the above described structures, the present invention can provide a masquerading detection system, a masquerading detection method, and a masquerading detection program that can detect masquerading with high precision by determining whether input images have plane relations with each other, without any additional devices other than an imaging device.

According to the present invention, determination is performed based only on image information about an inspection object, and therefore, any additional devices other than an imaging device are not required in providing a masquerading detection system, a masquerading detection method, and a masquerading detection program. Also, as the determination is performed based not on variations in luminance of the inspection object but on movement of the positions of feature points, it is possible to provide a masquerading detection system, a masquerading detection method, and a masquerading detection program that are resistant to changes of lighting environment.

BRIEF DESCRIPTION OF THE DRAWINGS

The above and other objects, features and advantages will become more apparent from the following description of preferred embodiments taken in conjunction with the accompanying drawings.

DESCRIPTION OF EXEMPLARY EMBODIMENTS

The following is a description of exemplary embodiments of the present invention, with reference to the accompanying drawings. It should be noted that, in all the drawings, like components are denoted by like reference numerals, and explanation of them will not be repeated.

First Exemplary Embodiment

Figure 1:
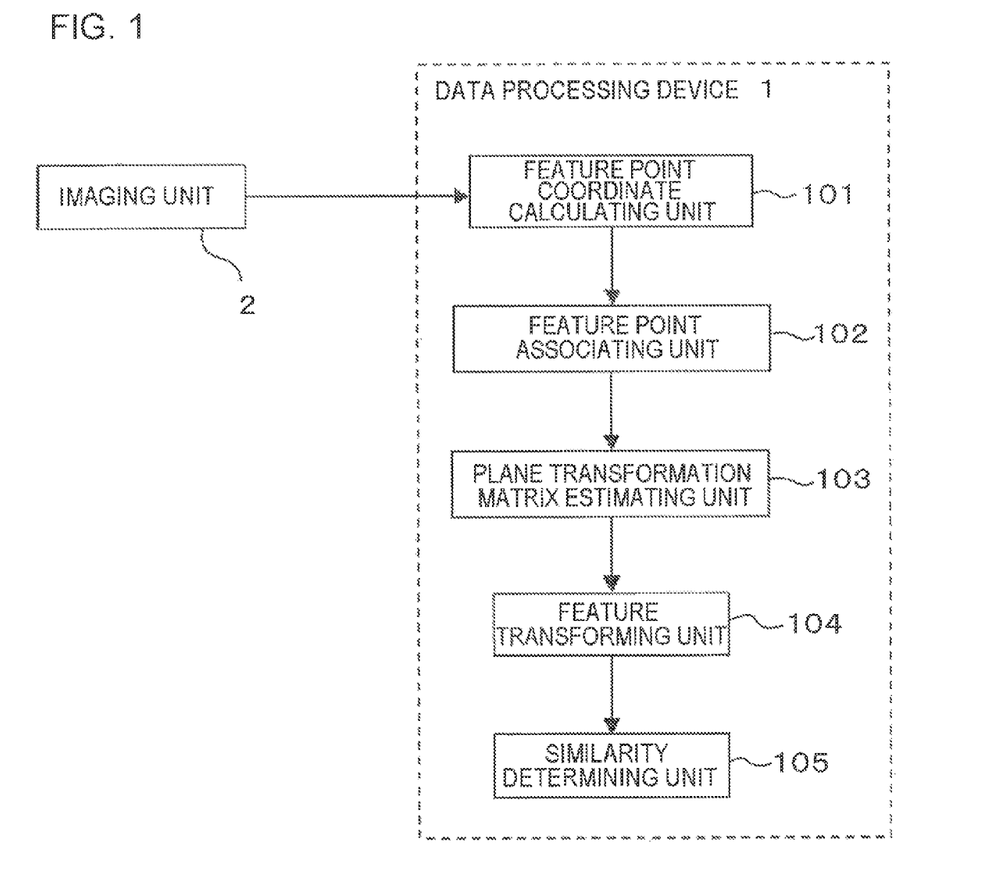
FIG. 1 is a functional block diagram of a masquerading detection system according to a first exemplary embodiment.

FIG. 1 is a diagram illustrating an example structure of a masquerading detection system. This exemplary embodiment provides a masquerading detection system that includes: an imaging unit 2 that obtains a first image by imaging an inspection object from a first angle, and a second image by imaging the inspection object from a second angle which is different from the first angle; a feature point coordinate calculating unit 101 that detects first feature points from the first image, obtains first feature point coordinates representing the positions of the detected feature points, detects second feature points from the second image, and obtains second feature point coordinates representing the positions of the detected feature points; a feature point associating unit 102 that associates the first feature points with the second feature points; a feature transforming unit 104 that obtains transformed coordinates by performing a plane projective transformation for the second feature point coordinates from the second image to the first image; and a similarity determining unit 105 that determines that masquerading has been attempted when the difference between the transformed coordinates and the corresponding first feature point coordinates is equal to or smaller than a predetermined value.

In a case where the angle formed by the first angle and the second angle of the imaging unit 2 with respect to the inspection object can be fixed, the later described transformation matrix is calculated in advance, and the plane transformation matrix estimating unit 103 of FIG. 1 may not perform any operation. In a case where the angle formed by the first angle and the second angle varies, the transformation matrix is calculated with the use of the plane transformation matrix estimating unit 103 every time the angle varies, and the similarity determining process is performed after that.

As shown in FIG. 1, the masquerading detection system includes a data processing device 1 operating under control of a program, and the imaging unit 2 that images an inspection object.

Here, the data processing device 1 includes the feature point coordinate calculating unit 101, the feature point associating unit 102, the plane transformation matrix estimating unit 103, the feature transforming unit 104, and the similarity determining unit 105 as described above.

The imaging unit 2 is a digital still camera, a digital video camera, a CCD camera module, or the like. The imaging unit 2 has the function to image an inspection object, and the function to output obtained image data to the data processing device 1.

From an image of the inspection object obtained by the imaging unit 2 from the first angle (the image will be hereinafter referred to as the first image), and an image of the inspection object obtained from the second angle (the image will be hereinafter referred to as the second image), the feature point coordinate calculating unit 101 acquires first feature point coordinates representing the positions of the feature points of the first image, and second feature point coordinates representing the positions of the feature points of the second image.

Here, a "feature point" means a point that appears always the same when viewed from a certain angle. A feature point may be a region in which a pattern distinguishable from the surroundings exists, such as the position of an eye, an edge of mouth, a mole, a tip of nose, the highest point of a cheek bone, a part of a mustache, hairline, a corner of a frame of glasses, or the like.

Those feature points are portions that can be detected by the Harris operator and the KLT technique (Non-Patent Document 1) by which a point having a large shading variation is extracted from an image, or the technique of detecting a desired portion by registering beforehand a specified pattern to be detected and performing template matching (Non-Patent Document 2).

Normally, template matching is a method of searching obtained images for an image region similar to a specified pattern (a template image) registered beforehand by comparing the obtained images with the specified pattern. In this exemplary embodiment, a specified pattern indicative of various feature points such as facial features and backgrounds is prepared in advance. The first feature points are extracted by comparing the first image with the specified pattern, and the second feature points are extracted by comparing the second image with the specified pattern. The degree of correlation between the specified pattern and the image region determined to be a region corresponding to the specified pattern is called "degree of confidence." As the credibility becomes higher, it may be judged that the corresponding image region becomes more similar to the specified pattern.

Although a feature point has been described as a portion on a facial feature point, obtained feature points may be feature points obtained from a background or a concealing object placed in front of the face or the head. A feature point in a background or a concealing object planarly moves like a face in a photograph, and can be expected to have a different variation from the variation of angle of the actual face.

The feature point associating unit 102 associates the first feature points with the second feature points. That is, the first feature point coordinates calculated by the feature point coordinate calculating unit 101 are associated with the second feature point coordinates also calculated by the feature point coordinate calculating unit 101. The correspondence relation between the first feature points and the second feature points associated with each other by the feature point associating unit 102 is obtained based on the luminance patterns surrounding the first feature points and the second feature points.

Specifically, the correspondence relation associates feature points with each other between the first feature points and the second feature points, wherein the feature points have similar luminance patterns and similar frequencies surrounding the feature points, and similar edge components, and the like. Alternatively, detected feature points are associated with each other by template matching. The associating process can be performed by calculating the degree of correlation between the image region representing the first feature points and the image region representing the second feature points, and extracting a pair having a high degree of correlation (the first and second feature points forming a pair). Hereinafter, combinations of the first feature points and the second feature points will be referred to as associated points.

The plane transformation matrix estimating unit 103 determines a transformation matrix to planarly transform the second image into the first image, using some of the feature points associated by the feature point associating unit 102.

To calculate the transformation matrix for plane transformation, a method disclosed in Non-Patent Document 3 may be used, for example. Non-Patent Document 3 discloses a method of calculating a transformation matrix, called "homography matrix".

A homography matrix H is expressed by the following formula (1):

$$H = \begin{pmatrix} p_1 & p_2 & p_3 \\ p_4 & p_5 & p_6 \\ p_7 & p_8 & p_9 \end{pmatrix} \quad \text{(formula 1)}$$

Where vector p is $(p_1, \ldots, p_9)$, the norm of this vector is $|p|=1$.

A homography matrix is a coordinate transformation matrix between two cameras that image the same point of an inspection object. When the same point are imaged, the coordinates of the point in the first image obtained by the camera 1 is (x, y), and the coordinates of the point in the second image obtained by the camera 2 is (X, Y).

Where the coordinates of two cameras of n points (n≥4) on the surface of an object are $(x_i, y_i)$ and $(X_i, Y_i)$, the points $(x_i, y_i)$ representing the n points in the first image are associated with the points $(X_i, Y_i)$ in the second image (i=1 . . . n).

Here, a matrix A is defined as follows:

$$A = \begin{pmatrix} X_1 & Y_1 & 1 & 0 & 0 & 0 & -X_1x_1 & -Y_1x_1 & -x_1 \\ 0 & 0 & 0 & X_1 & Y_1 & 1 & -X_1y_1 & -Y_1y_1 & -y_1 \\ X_2 & Y_2 & 1 & 0 & 0 & 0 & -X_2x_2 & -Y_2x_2 & -x_2 \\ 0 & 0 & 0 & X_2 & Y_2 & 1 & -X_2y_2 & -Y_2y_2 & -y_2 \\ \vdots & \vdots & \vdots & \vdots & \vdots & \vdots & \vdots & \vdots & \vdots \\ X_n & Y_n & 1 & 0 & 0 & 0 & -X_nx_n & -Y_nx_n & -x_n \\ 0 & 0 & 0 & X_n & Y_n & 1 & -X_ny_n & -Y_ny_n & -y_n \end{pmatrix} \quad \text{(formula 2)}$$

At this point, by determining the vector p that minimizes $|Ap^T|$, an optimum homography matrix H that defines the projection between the two images is determined. Here, the symbol T indicates transposition of the matrix. The homography matrix H is used as the transformation matrix, and the following projective transformation is performed to obtain (xw, yw, w).

$$\begin{pmatrix} xw \\ yw \\ w \end{pmatrix} = H \begin{pmatrix} X \\ Y \\ 1 \end{pmatrix} \quad \text{(formula 3)}$$

By dividing "xw, yw" by "w", (x, y) in the first image are obtained.

Although two cameras are used in this example, the first image and the second image may be obtained by imaging by a single camera from different angles.

The second feature point coordinates are transformed onto the first image by the plane transformation matrix estimated in the above manner, and transformed coordinates may be calculated. At the time of the calculation of the transformation matrix, some associated points with a great likelihood of a valid association may be used to determine the transformation matrix.

At the plane transformation matrix estimating unit 103, the transformation matrix is determined so that the difference between the second feature point transformed coordinates and the corresponding first feature point coordinates becomes smallest, with the use of the first feature points and the second feature points associated with each other by the feature point associating unit 102.

Next, a specific example of a method of estimating an optimum homography matrix using a part of the correspondence relation is described.

In this example, associations of eight feature points are obtained. First, as described above, associations of four points should be enough to calculate a homography matrix, and therefore, a provisional homography matrix as the first provisional transformation matrix is calculated using pairs formed by four points among pairs formed by the eight feature points associated with each other. With the use of the provisional homography matrix, the second feature point coordinates representing the pairs formed by the four points are projected onto the first image, so as to obtain the transformed coordinates of the four points. The differences between the transformed coordinates of the four points and the corresponding respective first feature point coordinates are calculated. Meanwhile, a provisional homography matrix as the second provisional transformation matrix is calculated with the use of the pairs formed by the remaining four points. With the use of the provisional homography matrix, the second feature point coordinates representing the pairs formed by the four points are projected onto the first image, to obtain the transformed coordinates of the four points. The differences between the transformed coordinates of the four points and the corresponding respective first feature point coordinates are calculated. The provisional transformation matrix having the smaller differences between the first provisional transformation matrix and the second provisional transformation matrix obtained as described above is estimated as a formal transformation matrix (homography matrix).

Although all the associations of the eight feature points are used at the time of calculation of a homography matrix in this example, a homography matrix can be estimated with higher precision by performing threshold processing on the degree of correlation among the previously obtained associated points and performing the above described calculation with the use of only the associations of the feature points from which a sufficiently high degree of correlation is obtained.

The above described contents can be generalized as follows. There are N correspondence relations (pairs) of the first feature points and the second feature points in this example. From the N pairs, first to Mth groups $G_1$ to $G_M$ each containing four pairs are generated. The pairs contained in the groups $G_1$ to $G_M$ may overlap with one another. With respect to those groups $G_1$ to $G_M$, the above-described provisional homography matrixes $PH_1$ to $PH_M$ are calculated. Respective transformed coordinates of those groups $G_1$ to $G_M$ are then calculated, and the differences (the norms in a Euclidean space or Manhattan distances, for example) between the transformed coordinates and the coordinates representing the corresponding first feature points are calculated. The provisional transformation matrix having the smallest total sum of differences is estimated as the transformation matrix (homography matrix).

The feature transforming unit 104 performs a plane projective transformation for the second coordinates into transformed coordinates in the first image, using the transformation matrix calculated by the plane transformation matrix estimating unit 103. In this manner, the projectively transformed coordinates of the second image is obtained in the first image.

The similarity determining unit 105 determines the difference between the projectively transformed coordinates of the second image obtained by the feature transforming unit 104 in the first image and the first coordinates in the first image. If the difference is equal to or smaller than a certain value, it is determined that there is a plane correspondence relation between the inspection objects shown in the first image and in the second image, and then that there is masquerading using a photograph. Here, a high degree of similarity indicates that the inspection object is similar to the actual person, and that determination indicates a large difference between the projectively transformed coordinates of the second image in the first image and the first coordinates in the first image.

With this arrangement, in a case where the first image and the second image of the object are imaged from different angles, plane deformation cannot be obtained unless the object is a photograph, and therefore, the object is determined not to be plane. As a result, it can be made to determine whether the object is plane.

Also, in this exemplary embodiment, if the object shown in the first image and the second image continues to be determined to have plane deformation over a certain period of time, the object may be determined to be a photograph.

In this exemplary embodiment, masquerading is detected simply by determining whether images formed by imaging an inspection object from two different directions at different angles to recognize a person have a plane projective relation with each other, as described above. Accordingly, three-dimensional information about the person to be authenticated does not need to be registered at the time of registration of the person.

With this arrangement, there is no need to obtain images of the person from various directions as in a case where three-dimensional information is required at the time of registration of the person. Thus, higher user-friendliness can be achieved.

Figure 2:
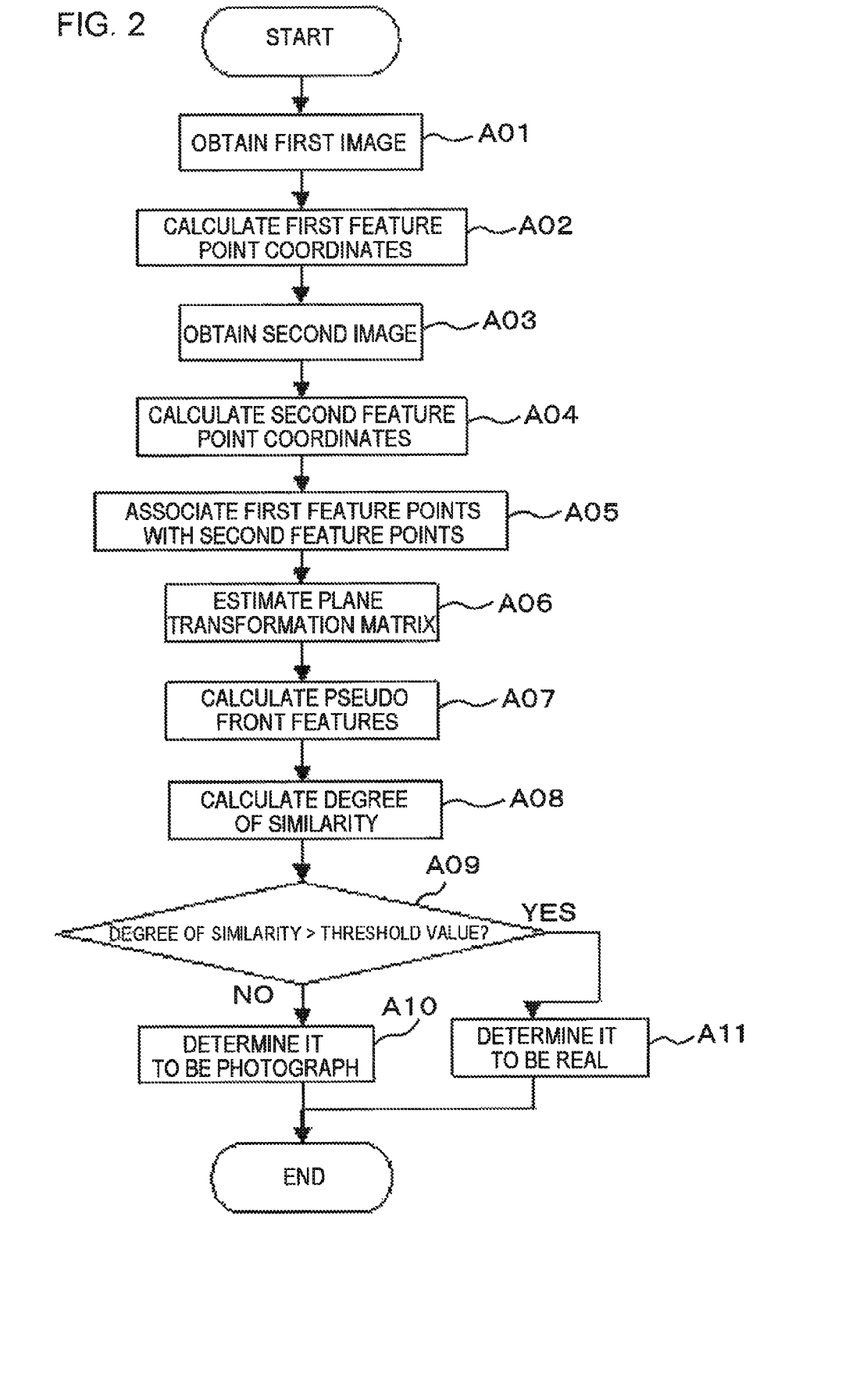
FIG. 2 is a flowchart illustrating an operation according to the first exemplary embodiment.

Referring now to the flowchart of FIG. 2, the masquerading detection method according to the first exemplary embodiment is described.

The masquerading detection method of FIG. 2 includes: step A01 of obtaining a first image by imaging an inspection object from a first angle; step A02 of detecting first feature points from the first image, and calculating first feature point coordinates representing the positions of the detected feature points; step A03 of obtaining a second image by imaging the inspection object from a second angle; step A04 of detecting second feature points from the second image, and calculating second feature point coordinates representing the positions of the detected feature points; step A05 of associating the first feature point coordinates with the second feature point coordinates; feature transforming step A07 of obtaining transformed coordinates by performing a plane projective transformation for the second feature point coordinates from the second image to the first image; and similarity determining step A10 of determining that masquerading has been attempted when the difference between the transformed coordinates and the corresponding first feature point coordinates is equal to or smaller than a predetermined value.

In a case where the angle formed by the first angle and the second angle can be fixed, the later described transformation matrix step A06 may be carried out in advance, and the plane transformation matrix step A06 of FIG. 2 may be skipped. In a case where the angle formed by the first angle and the second angle varies, the calculation of the transformation matrix estimating step A06 is performed every time the angle varies, and similarity calculating step A08 is then carried out, followed by similarity determining steps A09 to A11.

Next, each of the steps is described.
(Step A01)
First, an image of the object at the first angle is obtained by the imaging unit 2.
(Step A02)
In the first feature coordinate calculating step A02 after receipt of the first image, the first coordinates representing the positions of the first feature points are calculated from the first image.

Here, a "feature point" means a point that appears always the same when viewed from a certain angle. A feature point may be a region in which a pattern distinguishable from the surroundings exists, such as the position of an eye, an edge of mouth, a mole, a tip of nose, the highest point of a cheek bone, a part of a mustache, hairline, a corner of the frame of glasses, or the like. Although a feature point has been described as a facial feature point, an obtained feature point may be a feature point obtained from background or from a concealing object placed in front of the face or the head. A feature point in a background or a concealing object planarly moves like a face in a photograph, and can be expected to have a different variation from the variation of angle of the actual face.

Those feature points may be detected by a technique of extracting a point having a large shading variation in an image, or a technique of detecting a desired portion by registering beforehand a specified pattern to be detected and performing template matching. Also, a feature point is formed by one or more portions, but the first feature points and the second feature points do not need to be formed by exactly the same portion.

(Step A03)

An image of the object at the second angle is then obtained by the imaging unit 2.

(Step A04)

The feature point coordinate calculating unit 101 that has received the second image calculates the second coordinates representing the positions of the second feature points from the second image.

(Step A05)

An associating process is performed with the use of the two sets of feature point coordinates calculated in the first feature point coordinate calculating step A02 and the second feature point coordinate calculating step A04.

The correspondence relation associates feature points similar between the first feature points and the second feature points, wherein the feature points have similar luminance patterns surrounding the feature points, similar frequencies, similar edge components, and the like. Alternatively, the correspondence relation is obtained by a technique that detects feature points associated with each other with the use of template matching.

(Step A06)

With the use of the first feature point coordinates and the second feature point coordinates associated with each other as described above, the transformation matrix for planarly transforming the second image into the first image is determined. That is, in the plane transformation matrix estimating step, the second image is planarly and projectively transformed into the first image with the use of some feature point coordinates among the feature points associated with each other.

In a case where the angle formed by the first angle from which the first image is obtained and the second angle from which the second image is obtained is fixed, the plane transformation matrix estimating step A06 can be skipped if the transformation matrix is calculated in advance.

According to the masquerading detection method, the correspondence relation between the first feature points and the second feature points associated with each other by the feature point associating unit 102 may be obtained, for example, based on the luminance patterns surrounding the first feature points and the second feature points as described above.

According to the masquerading detection method, at the time of the calculation of the transformation matrix, some associated points with a great likelihood of a valid association may be used to determine the transformation matrix.

There are N correspondence relations (pairs) of first feature points and second feature points in this example. The masquerading detection method may include: the step of generating first to Mth groups $G_1$ to $G_M$ each containing four pairs among the N pairs, and calculating provisional transformation matrixes with respect to the groups $G_1$ to $G_M$; the step of obtaining respective transformed coordinates by performing a projective transformation for the second feature points with the use of the provisional matrixes, and calculating the differences (the norms in a Euclidean space or Manhattan distances, for example) between the provisional transformed coordinates and the coordinates representing the corresponding first feature points; and the step of selecting the provisional transformation matrix having the smallest differences as the transformation matrix from the provisional transformation matrixes with respect to the groups $G_1$ to $G_M$.

According to the masquerading detection method, the plane transformation matrix estimating step may include: the step of calculating the transformed coordinates of the second feature points by a provisional transformation matrix with the use of the first feature points and the second feature points associated with each other in the feature point associating step; and determining the transformation matrix to be the provisional matrix having the smallest difference between the calculated transformed coordinates and the first feature points corresponding to the subject feature points.

According to the masquerading detection method, the transformation matrix may be the above described homography matrix.

In a case where the first angle and the second angle are set in advance, coordinates transformed through a plane transformation matrix may be determined in advance.

(Step A07)

The feature point transforming process (a pseudo front feature calculating step) includes a feature transforming (pseudo front feature calculating) step of performing a projection transformation with the use of the transformation matrix obtained through the plane transformation matrix process.

The feature transforming (pseudo front feature calculating) step is the step of projectively transforming the second coordinates onto the first image with the use of the transformation matrix calculated in the plane transformation matrix estimating step A06.

(Step A08)

Lastly, in the similarity calculating step A08, the difference between the transformed coordinates of the second image projected onto the first image in the feature transforming (pseudo front feature calculating) step A07 and the transformed coordinates of the first image is determined.

(Step A09)

The difference between the transformed coordinates of the first image and the projectively transformed coordinates of the projected second image is regarded as the degree of similarity, and the degree of similarity is compared with a threshold value.

(Steps A10 and A11)

If the difference is equal to or smaller than a certain value, there is a plane correspondence relation between the inspection objects shown in the first image and in the second image, and it is judged that there is masquerading using a photograph. Here, a high degree of similarity indicates that the inspection object is similar to the actual person, and that judgment indicates a large difference.

With this arrangement, in a case where the first image and the second image of the object are obtained from different angles, plane deformation cannot be obtained unless the object is a photograph, and therefore, the object is determined not to be plane. As a result, it is possible to determine whether the object is plane or not.

Also, in this exemplary embodiment, if the object shown in the first image and the second image continues to be determined to have plane deformation over a certain period of time, the object may be determined to be a photograph.

If the degree of similarity is higher than the threshold value, the object is determined to be a photograph (A10). If the degree of similarity is lower than the threshold value, the object is determined to be real (A11). The operation then comes to an end.

With the structure of the invention, a detection of masquerading can be performed using a technique of transforming the second image into the first image with a plane transformation matrix and calculating the transformed coordinates, and masquerading can be detected simply by determining whether images formed by imaging an inspection object from different angles have a plane projective relation with each other at the time of recognition of the person. Accordingly, three-dimensional information about the person to be authenticated does not need to be registered at the time of registration of the person.

With this arrangement, there is no need to obtain images of the person from different directions at the time of registration of the person. Thus, higher user-friendliness can be achieved.

Figure 3:
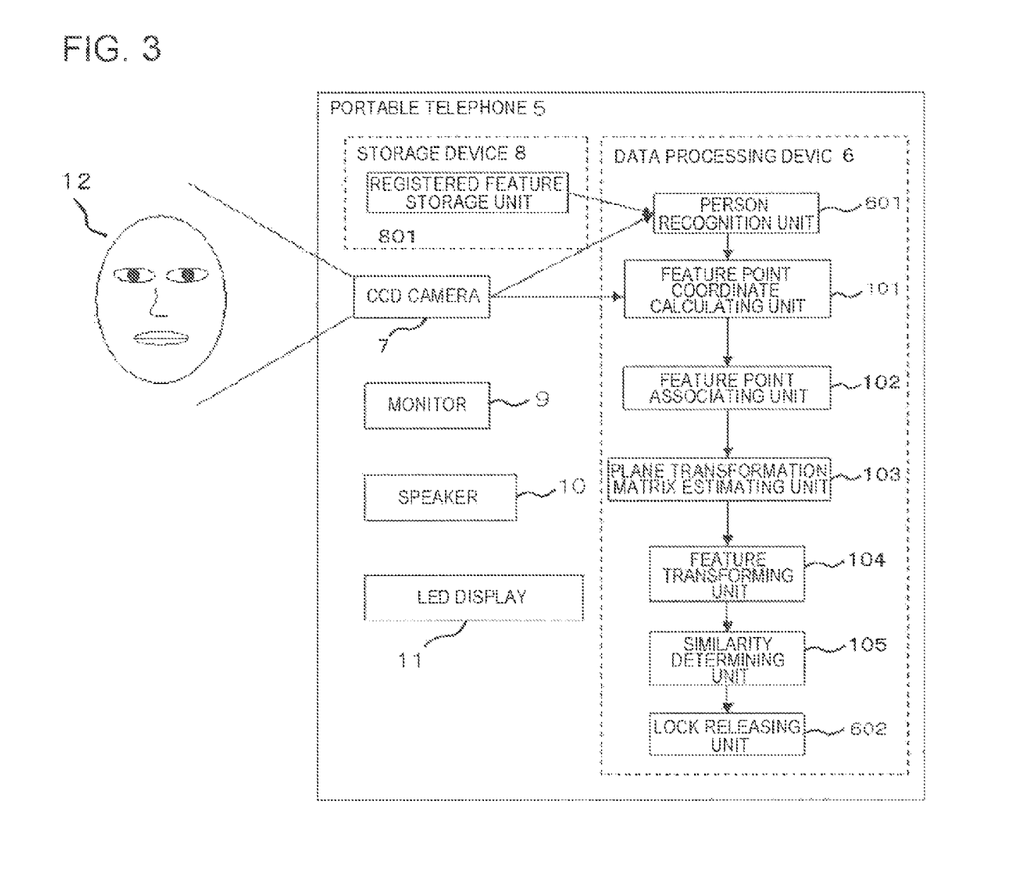
FIG. 3 is a functional block diagram of a specific example of the first exemplary embodiment.

Referring now to FIGS. 1 and 3, a program according to the first exemplary embodiment is described. FIG. 3 is a diagram illustrating the later described specific example of the structure illustrated in FIG. 1.

Each of the data processing device 1 of FIG. 1 and the data processing device 6 of FIG. 3 can be formed by an integrated circuit that includes a microprocessor, a ROM, a RAM, a signal transmission bus, and an input/output interface. All of or some of the functional blocks 101, 102, 103, 104, 601, and 602 of each of the data processing devices 1 and 6 may be embodied by hardware such as a semiconductor integrated circuit, or may be embodied by a program or program codes recorded on a recording medium such as a nonvolatile memory or an optical disk. Such a program or program codes cause a computer including a processor such as a CPU to perform all of or some of the operations of the functional blocks 101, 102, 103, 104, 601, and 602.

In FIG. 1, the masquerading detection program causes a computer to perform: a feature point calculating process to obtain first feature point coordinates representing the positions of first feature points from a first image of an inspection object, the first image being obtained from a first angle, and obtain second feature point coordinates representing the positions of second feature points from a second image of the inspection object, the second image being obtained from a second angle different from the first angle; a feature point associating process to associate the first feature points with the second feature points; a feature transforming process to obtain transformed coordinates by performing a plane projective transformation for second coordinates of the second feature points from the second image onto the first image, the second feature points being associated with the first feature points; and a similarity determining process to determine that masquerading has been attempted when the difference between the transformed coordinates and first coordinates of the corresponding first feature points is equal to or smaller than a predetermined value.

In a case where the angle formed by the first angle and the second angle of the imaging unit 2 with respect to the inspection object can be fixed, the plane transformation matrix estimating process of FIG. 1 may be skipped, as long as the later described transformation matrix is calculated in advance. In a case where the angle formed by the first angle and the second angle varies, the transformation matrix is calculated through the plane transformation matrix estimating process every time the angle varies, and the similarity determining process is performed after that.

The feature point coordinate calculating unit 101 of FIG. 1 causes the computer to perform; the process to obtain the first image of the object obtained by the imaging unit 2 from the first angle, and calculate the first coordinates of the first feature points from the first image; and the subsequent process to calculate the second coordinates of the second feature points from the second image of the inspection object imaged from the second angle different from the first angle.

Here, a "feature point" means a point that appears always the same when viewed from a certain angle. A feature point may be a region in which a pattern distinguishable from the surroundings exists, such as the position of an eye, an edge of mouth, a mole, a tip of nose, the highest point of a cheek bone, a part of a mustache, hairline, a corner of the frame of glasses, or the like. Although a feature point has been described as a facial feature point, an obtained feature point may be a feature point obtained from a background or from an object existing in front of the face or head.

Those feature points may be detected by a technique of extracting a point having a large shading variation in an image, or a technique of detecting a desired portion by registering beforehand a specified pattern to be detected and performing template matching. Also, a feature point is formed by one or more portions, but the first feature points and the second feature points do not need to be formed by exactly the same portion.

The feature associating unit of FIG. 1 causes the computer to perform the process of associating feature points with each other, using the coordinates of the two feature points calculated by the feature point coordinate calculating unit 101.

Here, the correspondence relation associates feature points similar between the first feature points and the second feature points, wherein the feature points have similar luminance patterns surrounding the feature points, similar frequencies, similar edge components, and the like. Alternatively, the correspondence relation is obtained by a technique of detecting feature points associated with each other with the use of template matching.

The plane transformation matrix estimating unit 103 of FIG. 1 causes the computer to perform the process to estimate the plane transformation matrix from the first feature point coordinates and the second feature point coordinates associated as described above, transform the second feature point coordinates on the first image with the use of the estimated plane transformation matrix and obtain the transformed coordinates.

In a case where the angle formed by the first angle from which the first image is obtained and the second angle from which the second image is obtained is fixed, the plane transformation matrix estimating unit 103 can be omitted if the transformation matrix is calculated in advance.

The correspondence relation between the first feature points and the second feature points associated by the feature point associating unit 102 may be the relation that can be obtained based on the luminance pattern surrounding the first feature points and the second feature points as described above, for example.

According to the masquerading detection program, at the time of the calculation of the transformation matrix, some associated points with a great likelihood of a valid association may be used to determine the transformation matrix.

According to the masquerading detection program, at the time of the calculation of the transformation matrix, provisional transformation matrixes may be calculated with the use of some of the associated points, the transformed coordinates may be calculated by transforming the second feature points not used in the calculation of the provisional transformation matrixes with the use of the provisional transformation matrixes, and the provisional transformation matrix having the smallest difference between the calculated transformed coordinates and the first feature points corresponding to the feature points may be regarded as the transformation matrix.

According to the masquerading detection program, the transformation matrix may be a transformation matrix for planarly projecting the second image onto the first image.

According to the masquerading detection program, the transformation matrix may be the above described homography matrix.

In a case where the first angle and the second angle are set in advance, coordinates transformed through a plane transformation matrix may be determined in advance.

There are N correspondence relations (pairs) of first feature points and second feature points in this example. The computer is caused to perform: the process to generate first to Mth groups $G_1$ to $G_M$ each containing four pairs among the N pairs, and calculate the above described provisional homography matrixes $PH_1$ to $PH_M$ with respect to the groups $G_1$ to $G_M$; the process to obtain respective transformed coordinates with respect to the groups $G_1$ to $G_M$, and calculate the differences (the norms in a Euclidean space or Manhattan distances, for example) between the transformed coordinates and the coordinates representing the corresponding first feature points; and the process to select the provisional transformation matrix having the smallest total sum of differences as the transformation matrix (homography matrix). The pairs contained in the groups $G_1$ to $G_M$ may overlap with one another.

The feature transforming unit 104 of FIG. 1 causes the computer to perform the process to projectively transform the second feature point coordinates into the first feature point coordinates, using the transformation matrix obtained through the plane transformation matrix estimating process.

The similarity determining unit 105 of FIG. 1 causes the computer to perform the process to determine the difference between the transformed coordinates in the first image and the projectively transformed coordinates of the projectively transformed second image obtained by the feature transforming unit 104.

In the similarity determining process, the computer is caused to perform the process to compare the degree of similarity with a threshold value, with the degree of similarity being the difference between the transformed coordinates and the corresponding second coordinates. If the difference is equal to or smaller than a certain value, it is determined that there is a plane correspondence relation between the inspection objects shown in the first image and in the second image, and then that there is masquerading using a photograph. Here, a high degree of similarity indicates that the inspection object is similar to the actual person, and that judgment indicates a large difference.

With this arrangement, in a case where the first image and the second image of the object are obtained from different angles, plane deformation cannot be obtained unless the object is a photograph, and therefore, the object is determined not to be plane. As a result, it is possible to determine whether the object is plane or not.

Also, in this exemplary embodiment, if the object shown in the first image and the second image continues to be determined to have plane deformation over a certain period of time, the object may be determined to be a photograph.

If the degree of similarity is higher than the threshold value, the object is determined to be a photograph. If the degree of similarity is lower than the threshold value, the object is determined to be real. The computer is then caused to end the operation.

With the structure of the invention, a detection of masquerading can be performed using a technique of transforming the second image into the first image with a plane transformation matrix and calculating the transformed coordinates, and masquerading can be detected simply by determining whether images formed by imaging an inspection object from different angles have a plane projective relation with each other at the time of recognition of the person. Accordingly, three-dimensional information about the person to be authenticated does not need to be registered at the time of registration of the person. With this arrangement, there is no need to obtain images of the person from different directions at the time of registration of the person. Thus, higher user-friendliness can be achieved.

Specific Example of the First Exemplary Embodiment

Next, a specific example of the first exemplary embodiment is described. FIG. 3 is a diagram illustrating a case where the masquerading detection system of FIG. 1 is applied to a portable telephone 5.

In the specific example of the exemplary embodiment, the portable telephone 5 with a camera is used. The imaging unit 2 is equivalent to a CCD camera 7 installed in the portable telephone 5, and the portable telephone 5 is security-locked in advance.

To unlock the security-locked portable telephone 5, the user performs an operation to use the portable telephone 5, such as pressing a key button of the portable telephone 5, or opening the portable telephone 5 if the portable telephone 5 is a flip phone, or sliding a panel if the portable telephone 5 is of a sliding type.

With such an operation being a trigger, the portable telephone 5 obtains an image of an inspection object 12 from the CCD camera 7. A person recognition unit 601 determines whether biological information in the obtained image has been obtained from the same person as a person having features registered beforehand in a registered feature storage unit 801 of a storage device 8. Here, the input image is compared with the registered features by a face verification technique disclosed in Patent Document 3, for example. When the image of the inspection object 12 is determined to be an image of the same person as a person having features registered as a result of the verification, an instruction to change the angle to image biological information is issued to the user through a monitor 9, a speaker 10, or a LED display 11 of the portable telephone 5.

Before or after the issuance of the instruction to the user, the image used in the person recognition is sent as the image at the first angle to the feature point coordinate calculating unit 101, and the feature point coordinate calculating unit 101 obtains the first coordinates of the first feature points.

The feature point coordinate calculating unit 101 then obtains an image at the second angle, different from the first image, from the CCD camera 7. The feature point coordinate calculating unit 101 then calculates the second feature point coordinates.

The feature point associating unit 102 associates the first feature points with the second feature points. That is, the first feature point coordinates calculated by the feature point coordinate calculating unit 101 are associated with the second feature point coordinates also calculated by the feature point coordinate calculating unit 101.

The correspondence relation associates feature points similar between the first feature points and the second feature points, wherein the feature points have similar luminance patterns surrounding the feature points, similar frequencies, similar edge components, and the like. Alternatively, the correspondence relation is obtained by a technique of detecting feature points associated with each other with the use of template matching. The correspondence relation associates feature points similar between the first feature points and the second feature points, wherein the feature points have similar luminance patterns surrounding the feature points, similar frequencies, similar edge components, and the like. Alternatively, the correspondence relation is obtained by a technique of detecting feature points associated with each other with the use of template matching or the like.

At the plane transformation matrix estimating unit 103, the transformation matrix is determined so that the difference between the second feature point coordinates and the corresponding first feature point coordinates becomes smallest, with the use of the first feature points and the second feature points associated with each other by the feature point associating unit 102.

Figure 4A:
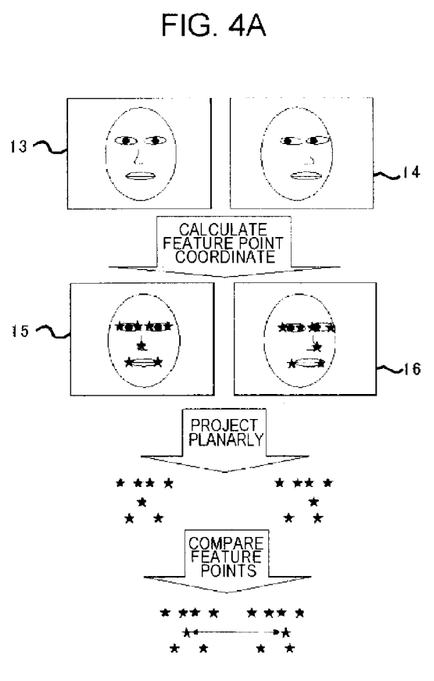
FIGS. 4A and 4B are diagrams illustrating a specific example of the first exemplary embodiment.

In a case where the inspection object 12 is an actual face, a positional difference appears between the transformed coordinates formed by planarly projecting the coordinates of the feature points of the second image onto the first image, and the corresponding first coordinates, as illustrated in FIG. 4A.

In FIG. 4A, a first image 13 obtained by imaging the inspection object from the first angle and a second image 14 obtained by imaging the inspection object from the second angle, which is on the left side of the inspection object shown in the first image 13, are shown on the top row. Feature point coordinates 15 obtained by calculating the coordinates of the feature points of the first image 13 are shown below the first image 13, and feature point coordinates 16 obtained by calculating the coordinates of the feature points of the second image 14 are shown below the second image 14. The feature point coordinates of the first image and the feature point coordinates obtained by planarly projecting the feature point coordinates of the second image onto the first image are indicated by stars below the feature point coordinates 15 of the first image and the feature point coordinates 16 of the second image. Further, a comparison between the feature point coordinates of the first image and the feature point coordinates obtained by planarly projecting the feature point coordinates of the second image onto the first image is shown below those feature point coordinates. In this drawing, the different part (the tip of nose, for example) between the feature point coordinates of the first image and the feature point coordinates obtained by planarly projecting the feature point coordinates of the second image onto the first image is indicated by arrows. Accordingly, the inspection object can be determined to be three-dimensional and be an actual face.

Figure 4B:
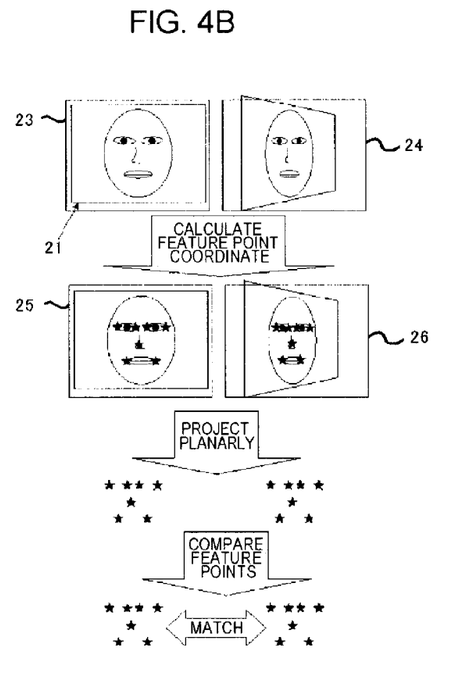

FIG. 4B illustrates the flow of determination to be performed in a case where an image of a face in a photograph has been obtained.

A first image 23 obtained by imaging an inspection object from a first angle, and an image 24 obtained by rotating a frame 21 that is the inspection object and imaging the frame 21 from a second angle (on the left side of the frame 23 of the inspection object), are shown on the top row. Feature point coordinates 25 obtained by calculating the coordinates of the feature points of the first image 23 are shown below the first image 23, and feature point coordinates 26 obtained by calculating the coordinates of the feature points of the second image 24 are shown below the second image 24. The feature point coordinates of the first image and the feature point coordinates obtained by planarly projecting the feature point coordinates of the second image onto the first image are indicated by stars below the feature point coordinates 25 of the first image and the feature point coordinates 26 of the second image. Further, a comparison between the feature point coordinates of the first image and the coordinates obtained by planarly projecting the feature point coordinates of the second image onto the first image is shown below those feature point coordinates. In this drawing, the thick arrow indicates that the feature point coordinates of the first image substantively match the feature point coordinates obtained by planarly projecting the feature point coordinates of the second image onto the first image. Accordingly, the inspection object is determined to be a plane photograph, and masquerading can be detected.

If the difference in the coordinates is equal to or larger than a threshold value, the inspection object 12 is determined to be an actual face, and the lock releasing unit 602 of FIG. 3 cancels the security lock of the portable telephone 5.

If the difference in coordinates is smaller than the threshold value, the security lock is not canceled, and the operation comes to an end. In this exemplary embodiment, the operation immediately comes to an end when the difference in coordinates is smaller than the threshold value. However, the second image may be repeatedly obtained to check for masquerading for a predetermined period of time until the difference in coordinates exceeds the threshold value.

As described above, when someone tries to unlock the security lock of the portable telephone 5 with the use of a photograph or a face image displayed on the monitor 9, any additional devices other than the imaging device are not required in the above structure. Also, masquerading can be stably detected without any registered three-dimensional information about the object, regardless of variations of lighting environments. Accordingly, unauthorized access to the portable telephone 5 can be prevented.

Next, the advantages of the first exemplary embodiment are described.

In this exemplary embodiment, masquerading is detected based on only images obtained from the inspection object 12, and accordingly, masquerading detection can be performed without any additional devices other than the imaging device.

Also, in this exemplary embodiment, masquerading is detected based on variations of the positions of feature points, not on a variation of the luminance of the inspection object. Accordingly, masquerading detection can be performed in a manner that is resistant to variations of lighting environments around the inspection object 12.

Further, in this exemplary embodiment, masquerading is detected simply by determining whether images formed by imaging the inspection object 12 from different angles have a plane projective relation with each other at the time of recognition of the person. Accordingly, three-dimensional information about the person to be authenticated does not need to be registered at the time of registration of the person. With this arrangement, there is no need to obtain images of the person from different directions at the time of registration of the person. Thus, higher user-friendliness can be achieved.

Second Exemplary Embodiment

Figure 5:
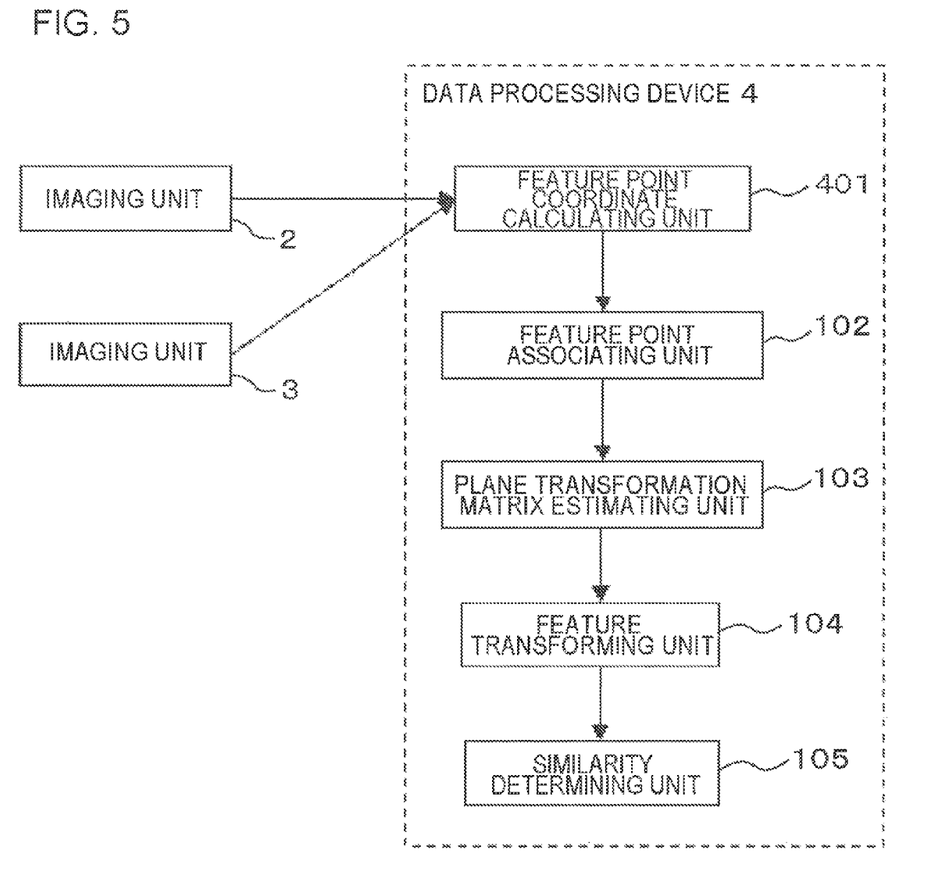
FIG. 5 is a functional block diagram of a masquerading detection system according to a second exemplary embodiment.

Referring now to FIG. 5, a second exemplary embodiment of the present invention is described.

The second exemplary embodiment provides a masquerading detection system that includes: a first imaging unit 2 that obtains a first image by imaging an inspection object 12 from a first angle; a second imaging unit 3 that obtains a second image by imaging the inspection object 12 from a second angle which is different from the first angle; a feature point coordinate calculating unit 401 that detects first feature points from the first image, obtains first feature point coordinates representing the positions of the detected feature points, detects second feature points from the second image, and obtains second feature point coordinates representing the positions of the detected feature points; a feature point associating unit 102 that associates the first feature points with the second feature points; a feature transforming unit 104 that obtains transformed coordinates by performing a plane transformation for the second feature point coordinates to the first image; and a similarity determining unit 105 that determines that masquerading has been attempted when the difference between the transformed coordinates and the corresponding first feature point coordinates is equal to or smaller than a predetermined value.

As illustrated in FIG. 5, the second exemplary embodiment of the present invention differs from the first exemplary embodiment in that the data processing device 1 of the first exemplary embodiment illustrated in FIG. 1 is replaced with the data processing device 4 operating under the control of a program, the feature point coordinate calculating unit 101 is replaced with a feature point coordinate calculating unit 401, and an imaging unit 3 is added to the first exemplary embodiment.

The imaging unit 2 and the imaging unit 3 are positioned so as to image the inspection object 12 from different angle from each other. In the specific example, the imaging devices 2 and 3 may be two CCD cameras 7 installed in the portable telephone 5. With this arrangement, the first angle and the second angle can be fixed. Accordingly, a plane transformation matrix is calculated beforehand, and the plane transformation matrix estimating unit 103 can be eliminated.

The feature point coordinate calculating unit 401 obtains a first image at a first angle and a second image at a second angle different from the first angle, from the imaging unit 2 and the imaging unit 3 almost at the same time. The feature point coordinate calculating unit 401 then obtains first feature point coordinates and second feature point coordinates.

The feature point associating unit 102 associates the first feature points with the second feature points. That is, the first feature point coordinates calculated by the feature point coordinate calculating unit 401 are associated with the second feature point coordinates also calculated by the feature point coordinate calculating unit 401.

The correspondence relation associates feature points similar between the first feature points and the second feature points, wherein the feature points have similar luminance patterns surround the feature points, similar frequencies, similar edge components, and the like. Alternatively, the correspondence relation is obtained by a technique of detecting feature points associated with each other with the use of template matching. The correspondence relation associates feature points similar between the first feature points and the second feature points, wherein the feature points have similar luminance patterns surrounding the feature points, similar frequencies, similar edge components, and the like. Alternatively, the correspondence relation is obtained by a technique of detecting feature points associated with each other with the use of template matching or the like.

The plane transformation matrix estimating unit 103 obtains a transformation matrix to planarly transform the second image into the first image, based on first coordinates and second coordinates extracted by the feature point coordinate calculating unit 401.

If the angle formed by the imaging unit 2 and the imaging unit 3 can be assumed to be fixed, the transformation matrix may be calculated beforehand from the angle formed by the imaging unit 2 and the imaging unit 3. In that case, the plane transformation matrix estimating unit 103 does not perform any operation.

Thereafter, the same procedures as those of the first exemplary embodiment are carried out.

Next, the advantages of the second exemplary embodiment are described.

First, with the above described structure, this exemplary embodiment of the present invention can achieve the same effects as those of the first exemplary embodiment. Also, with this structure, there is no need to perform an operation to change the image obtaining angle of the inspection object 12, and the user-friendliness is expected to improve.

This application is based on Japanese patent application No. 2008-277212, filed on Oct. 28, 2008, the entire contents of which are incorporated hereinto by reference.

The invention claimed is:

1. A masquerading detection system comprising:
    an imaging unit obtaining a first two-dimensional image by imaging an inspection object from a first angle, and a second two-dimensional image by imaging the inspection object from a second angle which is different from the first angle;
    a feature point coordinate calculating unit detecting first feature points from the first two-dimensional image, obtaining first feature point coordinates representing positions of the detected feature points, detecting second feature points from the second two-dimensional image, and obtaining second feature point coordinates representing positions of the detected feature points;
    a feature point associating unit associating the first feature points with the second feature points;
    a feature transforming unit obtaining transformed coordinates by performing a plane projective transformation for the second feature point coordinates from the second two-dimensional image to the first two-dimensional image;
    a similarity determining unit obtaining a difference between the transformed coordinates and the first feature point coordinates and determining that masquerading has been attempted when the obtained difference is equal to or smaller than a predetermined value; and
    a plane transformation matrix estimating unit determining a transformation matrix from the second two-dimensional image to the first two-dimensional image with the use of the first feature point coordinates and the second feature point coordinates, wherein said feature transforming unit performs the projective transformation with the use of the transformation matrix, and wherein the transformation matrix is a homography matrix.

2. The masquerading detection system according to claim 1, wherein the first feature points and the second feature points are points at which variations of shading in the two-dimensional images are large.

3. The masquerading detection system according to claim 1, wherein the first feature points and the second feature points are points corresponding to portions registered in advance.

4. The masquerading detection system according to claim 1, wherein the first feature points and the second feature points include feature points of the inspection object, and feature points of an object other than the inspection object.

5. The masquerading detection system according to claim 1, wherein a correspondence relation between the first feature points and the second feature points associated with each other by said feature point associating unit is obtained based on a luminance pattern surrounding the first feature points and the second feature points.

6. The masquerading detection system according to claim 1, wherein said plane transformation matrix estimating unit generates a plurality of groups each including four pairs from some pairs of associated feature points among the first feature points and the second feature points associated with each other by said feature point associating unit, calculates a plurality of provisional transformation matrixes with respect to the plurality of groups, obtains provisional transformed coordinates by performing the projective transformation for the second feature points with the use of the provisional transformation matrixes, calculates differences between the provisional transformed coordinates and coordinates representing the corresponding first feature points, and selects, as the transformation matrix, a provisional transformation matrix having the smallest difference among the plurality of provisional transformation matrixes.

7. The masquerading detection system according to claim 1, wherein said plane transformation matrix estimating unit determines the transformation matrix so that the difference between the transformed coordinates and the corresponding first feature point coordinates becomes smallest, using the first feature points and the second feature points associated with each other by said feature point associating unit.

8. The masquerading detection system according to claim 1, wherein the first angle and the second angle are determined in advance, and the transformation matrix from the second two-dimensional image to the first two-dimensional image is prepared in advance.

9. The masquerading detection system according to claim 1, further comprising:
a registered feature storage unit in which features of the inspection object are registered in advance;
a person recognition unit performing pattern verification between the first two-dimensional image obtained by said imaging unit imaging the inspection object from the first angle and the features registered in said registered feature storage unit; and
a speaker issuing an instruction to change an angle at which the inspection object is to be imaged, when the inspection object is determined to be a subject person as a result of a comparison through the pattern verification.

10. The masquerading detection system according to claim 1, wherein said masquerading detection system is incorporated into a communication apparatus, and comprises a lock releasing unit cancelling a security lock of said communication apparatus when said similarity determining unit determines that there is no masquerading and not cancelling the security lock of said communication apparatus when said similarity determining unit determines that there is masquerading.

11. The masquerading detection system according to claim 1, wherein said imaging unit includes a first imaging unit obtaining the first two-dimensional image, and a second imaging unit obtaining the second two-dimensional image.

12. A masquerading detection method comprising:
obtaining a first two-dimensional image by imaging an inspection object from a first angle;
detecting first feature points from the first two-dimensional image;
calculating first feature point coordinates representing positions of the detected feature points;
obtaining a second two-dimensional image by imaging the inspection object from a second angle;
detecting second feature points from the second two-dimensional image;
calculating second feature point coordinates representing positions of the detected feature points;
associating the first feature point coordinates with the second feature point coordinates;
obtaining transformed coordinates by performing a plane projective transformation for the second feature point coordinates from the second two-dimensional image to the first two-dimensional image;
obtaining a difference between the transformed coordinates and the first feature point coordinates;
determining that masquerading has been attempted when the obtained difference is equal to or smaller than a predetermined value; and
determining a transformation matrix from the two-dimensional second image to the first two-dimensional image with the use of the first feature point coordinates and the second feature point coordinates, wherein said obtaining the transformed coordinates performs the projective transformation with the use of the transformation matrix, and wherein the transformation matrix is a homography matrix.

13. The masquerading detection method according to claim 12, wherein said determining the transformation matrix includes:
generating a plurality of groups each including four pairs from some pairs of associated feature points among the first feature points and the second feature points associated with each other;
calculating a plurality of provisional transformation matrixes with respect to the plurality of groups;
obtaining provisional transformed coordinates by performing the projective transformation for the second feature points with the use of the provisional transformation matrixes;
calculating differences between the provisional transformed coordinates and coordinates representing the corresponding first feature points; and
selecting, as the transformation matrix, a provisional transformation matrix having the smallest difference among the plurality of provisional transformation matrixes.

14. The masquerading detection method according to claim 12, wherein said determining the transformation matrix determines the transformation matrix so that the difference between the transformed coordinates and the corresponding first feature point coordinates becomes smallest, using the first feature points and the second feature points associated with each other.

15. A non-transitory computer-readable storage medium storing a program for causing a computer to perform:
obtaining first feature point coordinates representing positions of first feature points from a first two-dimensional image of an inspection object, the first two-dimensional image being imaged from a first angle;
obtaining second feature point coordinates representing positions of second feature points from a second two-dimensional image of the inspection object, the second two-dimensional image being imaged from a second angle different from the first angle;
associating the first feature points with the second feature points;

obtaining transformed coordinates by performing a plane projective transformation for second coordinates of the second feature points from the second two-dimensional image to the first two-dimensional image, the second feature points being associated using the first feature points and the second feature points;

obtaining a difference between the transformed coordinates and the first feature point coordinates;

determining that masquerading has been attempted when the obtained difference is equal to or smaller than a predetermined value; and determining a transformation matrix from the second two-dimensional image to the first two-dimensional image with the use of the first feature point coordinates and the second feature point coordinates, wherein said obtaining transformed coordinates performs the projective transformation using the transformation matrix, wherein the transformation matrix is a homography matrix.

16. The non-transitory computer-readable storage medium according to claim 15, wherein said determining the transformation matrix includes:

generating a plurality of groups each including four pairs from some pairs of associated feature points among the first feature points and the second feature points associated with each other by said feature point associating process;

calculating a plurality of provisional transformation matrixes with respect to the plurality of groups;

obtaining provisional transformed coordinates by performing the projective transformation for the second feature points with the use of the provisional transformation matrixes;

calculating differences between the provisional transformed coordinates and coordinates representing the corresponding first feature points; and selecting, as the transformation matrix, the provisional transformation matrix having the smallest difference among the plurality of provisional transformation matrixes.

\* \* \* \* \*